(12) United States Patent
Wrolson et al.

(10) Patent No.: US 10,987,533 B2
(45) Date of Patent: Apr. 27, 2021

(54) PLAY STRUCTURE CLAMP AND SYSTEM

(71) Applicant: Landscape Structures Inc., Delano, MN (US)

(72) Inventors: Darryl T. Wrolson, Minnetrista, MN (US); Thomas L. Keller, Delano, MN (US)

(73) Assignee: Landscape Structures, Inc., Delano, MN (US)

( * ) Notice: Subject to any disclaimer, the term of this patent is extended or adjusted under 35 U.S.C. 154(b) by 48 days.

(21) Appl. No.: 15/805,722

(22) Filed: Nov. 7, 2017

(65) Prior Publication Data

US 2018/0126206 A1 May 10, 2018

Related U.S. Application Data

(60) Provisional application No. 62/418,977, filed on Nov. 8, 2016.

(51) Int. Cl.
| | |
|---|---|
| *A63B 9/00* | (2006.01) |
| *A63B 71/02* | (2006.01) |
| *A63B 17/04* | (2006.01) |
| *A63G 31/00* | (2006.01) |
| *F16B 2/08* | (2006.01) |

(Continued)

(52) U.S. Cl.
CPC ............. *A63B 9/00* (2013.01); *A63B 17/04* (2013.01); *A63B 71/023* (2013.01); *A63G 31/00* (2013.01); *A63B 2009/006* (2013.01); *A63B 2071/024* (2013.01); *A63B 2225/09* (2013.01); *F16B 2/08* (2013.01); *F16B 5/0685* (2013.01); *F16M 13/022* (2013.01)

(58) Field of Classification Search
CPC ......... A63B 9/00; A63B 17/04; A63B 71/023; A63B 2071/024; A63B 2225/09; A63B 2009/006; A63G 31/00; F16B 2/08; F16B 5/0685; F16M 13/022; E04B 1/32
See application file for complete search history.

(56) References Cited

U.S. PATENT DOCUMENTS

| | | | |
|---|---|---|---|
| 5,941,041 A * | 8/1999 | Robinson | A63B 9/00 |
| | | | 472/116 |
| 6,419,587 B1 * | 7/2002 | Geyer | A63G 21/00 |
| | | | 472/116 |

(Continued)

OTHER PUBLICATIONS

Search Report for PCT application No. PCT/US2017/060310, dated Feb. 22, 2018, 12 pages.

(Continued)

*Primary Examiner* — Andrew S Lo
(74) *Attorney, Agent, or Firm* — Wesley W. Malherek; Kelly, Holt & Christenson, PLLC

(57) ABSTRACT

A climbing structure is provided. The climbing structure comprises a first support post and a second support post. The climbing structure also comprises a panel with a first and second connection point. The climbing structure also has a first clamp, configured to couple the panel to the first support post at the first connection point. The climbing structure also has a second clamp, configured to couple the panel to the second support post at the first connection point. The first connection point is on a first connection plane. The second connection point is on a second connection plane. The first and second connection planes are offset from each other.

19 Claims, 20 Drawing Sheets

(51) Int. Cl.
*F16B 5/06* (2006.01)
*F16M 13/02* (2006.01)

(56) References Cited

U.S. PATENT DOCUMENTS

| | | | | |
|---|---|---|---|---|
| 6,419,610 | B1* | 7/2002 | Jonas | A63B 69/0048 |
| | | | | 446/110 |
| 6,699,158 | B1* | 3/2004 | Richardson | A63B 69/0048 |
| | | | | 198/850 |
| D616,519 | S * | 5/2010 | Hwang | D21/826 |
| 2002/0040499 | A1* | 4/2002 | Atkinson | E04H 4/06 |
| | | | | 4/496 |
| 2003/0194265 | A1 | 10/2003 | Krauss | |
| 2007/0082791 | A1 | 4/2007 | Reese et al. | |
| 2011/0319230 | A1* | 12/2011 | Brendle | A63B 23/03541 |
| | | | | 482/37 |
| 2013/0313499 | A1* | 11/2013 | Krauss | A63H 33/008 |
| | | | | 256/24 |

OTHER PUBLICATIONS

PCT/US2017/060310 International Preliminary Report on Patentability dated May 14, 2019, 8 pages.

\* cited by examiner

PLAY STRUCTURE CLAMP AND SYSTEM

CROSS-REFERENCE TO RELATED APPLICATION

The present application is based on and claims the benefit of U.S. provisional patent application Ser. No. 62/418,977, filed Nov. 8, 2016, the content of which is hereby incorporated by reference in its entirety.

BACKGROUND

Research has found that learning and playing on playgrounds facilitates learning other subjects and enhances skills that children inevitably use in other areas. Childhood is the time when children learn about their world, primarily through play. If a play environment contains sufficiently rich, stimulating elements, there will be a continuous exposure to new elements followed by the child's playful experimentation and learning. One example of a playground feature used to facilitate learning dexterity skills is the climbing structure, which allows students to learn to climb, and fall.

SUMMARY

A climbing structure is provided. The climbing structure comprises a first support post and a second support post. The climbing structure also comprises a panel with a first and second connection point. The climbing structure also has a first clamp, configured to couple the panel to the first support post at the first connection point. The climbing structure also has a second clamp, configured to couple the panel to the second support post at the second connection point. The first connection point is on a first connection plane. The second connection point is on a second connection plane. The first and second connection planes are offset from each other.

DETAILED DESCRIPTION OF ILLUSTRATIVE EMBODIMENTS

Figure 1A:
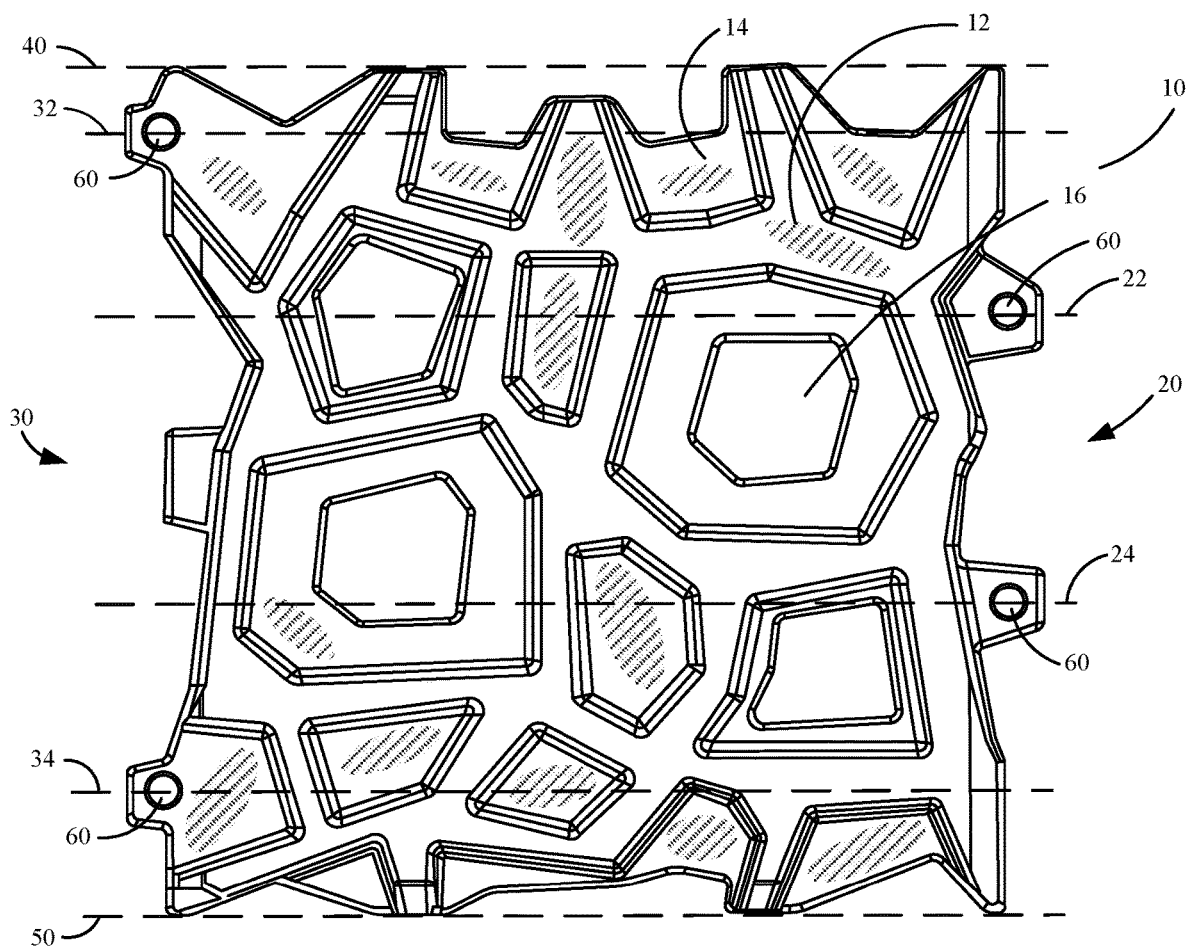
FIGS. 1A-1D illustrate one example of panel and clamp components that can be used to create a playground climbing structure in accordance with one embodiment of the present invention.

Providing an outdoor play structure presents many logistical challenges. The outdoor environment presents temperatures at both hot and cold extremes. Further, an outdoor structure is also exposed to weather—wind, rain and particulates, and has to maintain durability under both temperature and weather extremes. Additionally, most outdoor play structures are designed for infrequent, or no, regular maintenance. Playground construction also requires theft prevention considerations, requiring that no part of the structure be easily removed, or disassembled, while also allowing for repairs to be conducted, when necessary. Additionally, there are vandalism concerns, as outdoor play structures may be used in areas with little or no supervision. Therefore, it is important that play structures be constructed to withstand vandalism. However, while some embodiments are described herein in the context of permanent installation within a playground environment, at least some embodiments are also suited for installation in other outdoor recreational areas, such as parks, for example. Additionally, some embodiments may also be suitable for use in indoor environments.

One known popular playground feature is a climbing tower or wall, which allows children to practice climbing up a distance from the ground, learning hand-eye coordination and dexterity. The climbing feature also should be designed for use by individuals of varying ages and abilities. However, it is also desired that the climbing structure not seem to be consisting of repeating parts, as that may not provide sufficient stimulus to a child. Therefore, it would be useful to have a panel that could be installed within a play structure to allow for the creation of a climbing wall that does not appear to be made of repeating components.

Many play structures include clamps to hold components together, for example inserting a platform requires clamping to one or more posts. Many climbing structures rely on the use of clamps and platforms for construction and design. One known problem with existing play structure construction is the placement of clamps on support posts without causing interference between adjacent features.

The present disclosure relates to a clamp design for a playground environment, as well as a clamp and panel system configured to provide reduced clamp conflicts in playground construction and design. Clamps can comprise a variety of mechanisms depending on the type and situation of use. However, clamps can also be specialized for use in a specific way, for a specific purpose. The process of specialization can require many parts that may not be interchangeable between types of clamps.

Another important consideration for clamp design is ease of installation. For example, the clamp could come in two parts for ease of installation around a fixed play structure post. In one embodiment, the two parts are identical, such that when flipped, interlocked with each other. However, no matter how narrow a clamp may be, it may still have a conflict with another clamp associated with another feature that should be coupled to the same post. Therefore, it is beneficial to have the clamps attached to a structure that would seek to minimize or eliminate clamp conflicts, allowing for more interesting and complex climbing structures to be assembled.

One solution to clamp conflicts is the use of offset clamps, however offset clamps require two different components, a left and right side, for example. Another solution is the use of platforms, which may support the connection of other playground features from the platform, instead of direct attachment to one or more of the posts.

One solution described herein is for a play structure clamp that is narrower, with a lower profile, allowing it to fit to into tighter places, while maintaining structural durability. In addition to size and strength, the clamp could be made of fewer unique parts thereby reducing the cost to produce and replace them.

FIGS. 1A-1D illustrate one example of panel and clamp components that can be used to create a playground climbing structure in accordance with one embodiment of the present invention. However, while one design of a panel is shown, it is to be understood that other designs, with other aesthetic and interactive components, could also be used herein.

FIG. 1A illustrates a panel 10 that can be used to create a climbing structure in accordance with one embodiment. For example, panel 10 may comprise a first edge 20, a second edge 30, as well as a top edge 40, and a bottom edge 50. Together, edges 20, 30, 40 and 50 comprise a parallelogram configured such that first and second edges 20 and 30 are parallel to each other, and configured to couple to adjacent play structure posts. As illustrated in FIG. 1A, panel 10 comprises comprise a square, however other shapes may also be suitable, such as a rectangle, trapezoid or any other suitable shape.

In one embodiment, panel 10 comprises a plurality of raised edges 12, within a panel face 14. In some embodiments, panel 10 also comprises one or more cutouts 16 which may be useful in order for a child to fully engage with the panel, for example to grab onto with a hand, or to rest a foot on while climbing.

As illustrated in FIG. 1A, panel 10 may comprise a plurality of connection points 60, each of which is configured to couple to a play structure post using a clamp. As illustrated in FIG. 1A, in one embodiment, each connection point 60 is on a connection plane. For example, on first side 20, connection points 60 are on a first connection plane 22 and a second connection plane 24, which are different from, and do not conflict with a third connection plane 32 and a fourth connection plane 34, defined by connection points 60 on second edge 30.

Figure 1B:
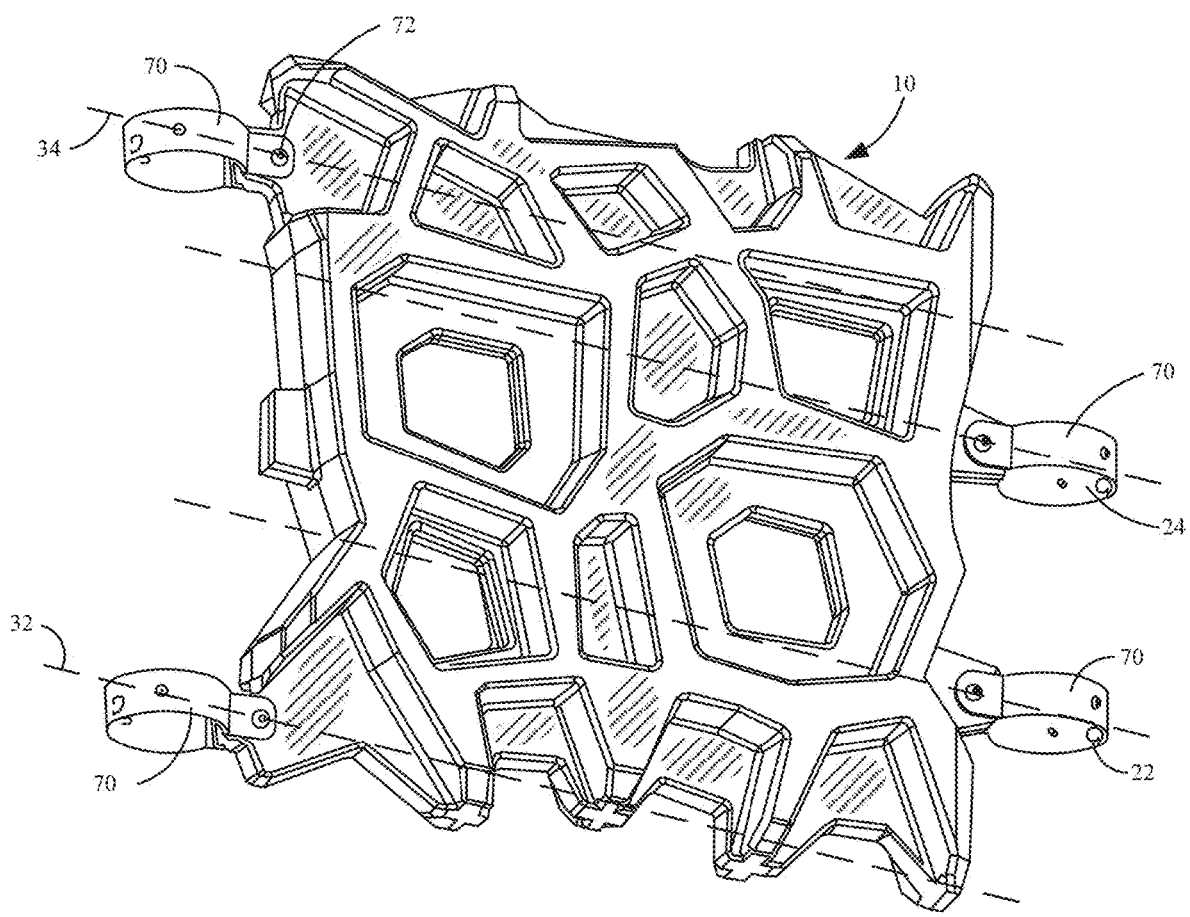

FIG. 1B illustrates a set of clamps 70 attached to panel 10, at connection points 60. As illustrated in FIG. 1B, each clamp 70 is attached along one of the four clamp attachment planes, 24, 22, 32, and 34. In one embodiment, clamps 70 are attached by one or more fastening mechanism 72.

Figure 1C:
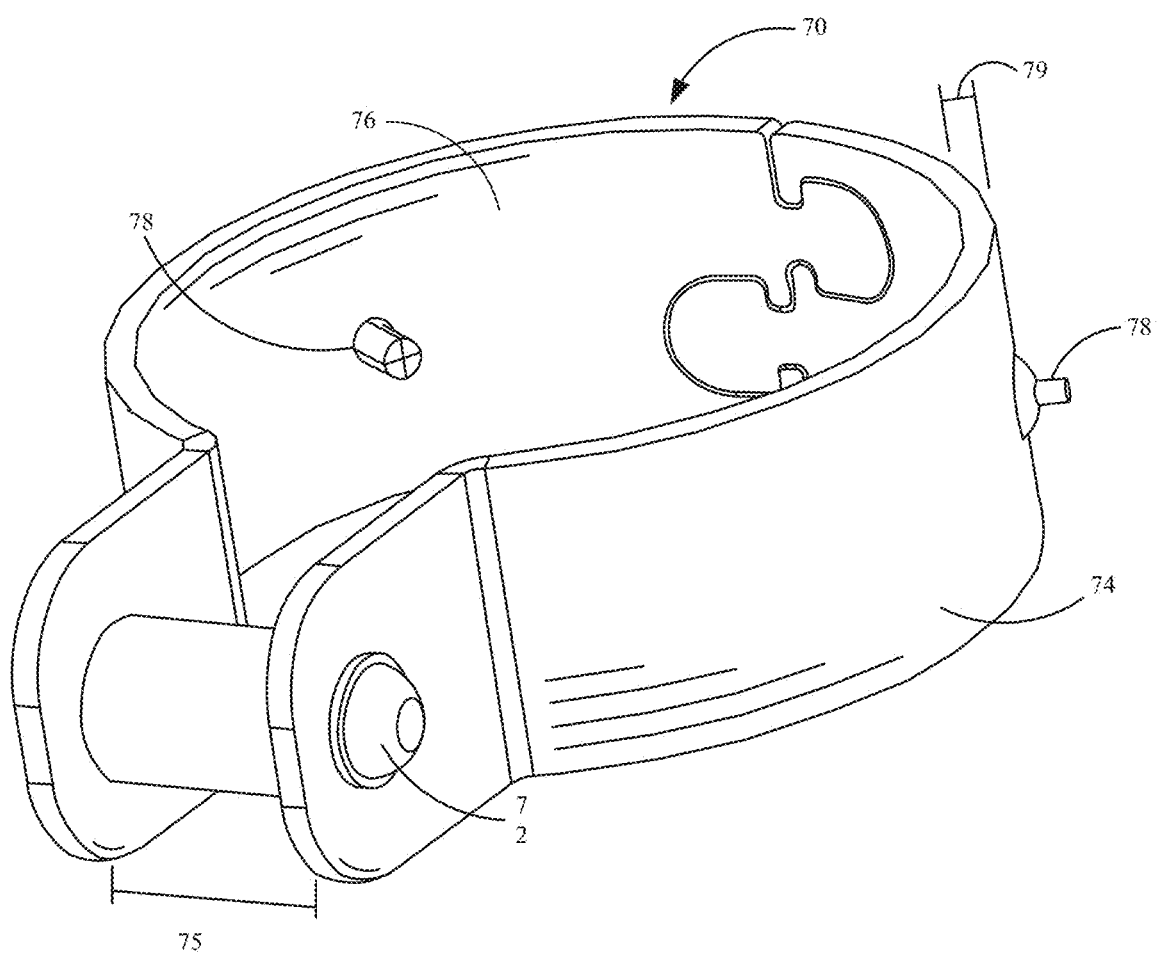

FIG. 1C illustrates a perspective view of clamp 70 and fastener 72 in isolation. Clamp 70 may have one or more clamp attachment mechanisms 72 configured to attach clamp 70 about a circumference of a play structure post. In one embodiment, clamp 70 comprises a first clamp portion 74 that couples to a second clamp portion 76. Each of portions 74 and 76 comprise, for example, a flange coupled to a curved section, configured to couple to a surface of a play structure post, and a locking feature configured to couple one portion to another. In one embodiment, clamp portions 74 and 76 are identical, such that when clamp portion 74 is rotated 90°, it can couple to, and receive clamp portion 76. In one embodiment, clamp portion 74 and 76 may comprise a plurality of features 78 which may be used to fasten clamp 70 to a play structure post, for example rivets or other fastening mechanisms. In one embodiment, clamp 70 is identified by a thickness 79. Fastening mechanism 72 may span the length of a separation thickness 75. In on embodiment, thickness 79 is ³⁄₁₆ inch. In one embodiment, clamp 70 comprises stainless steel.

Figure 1D:
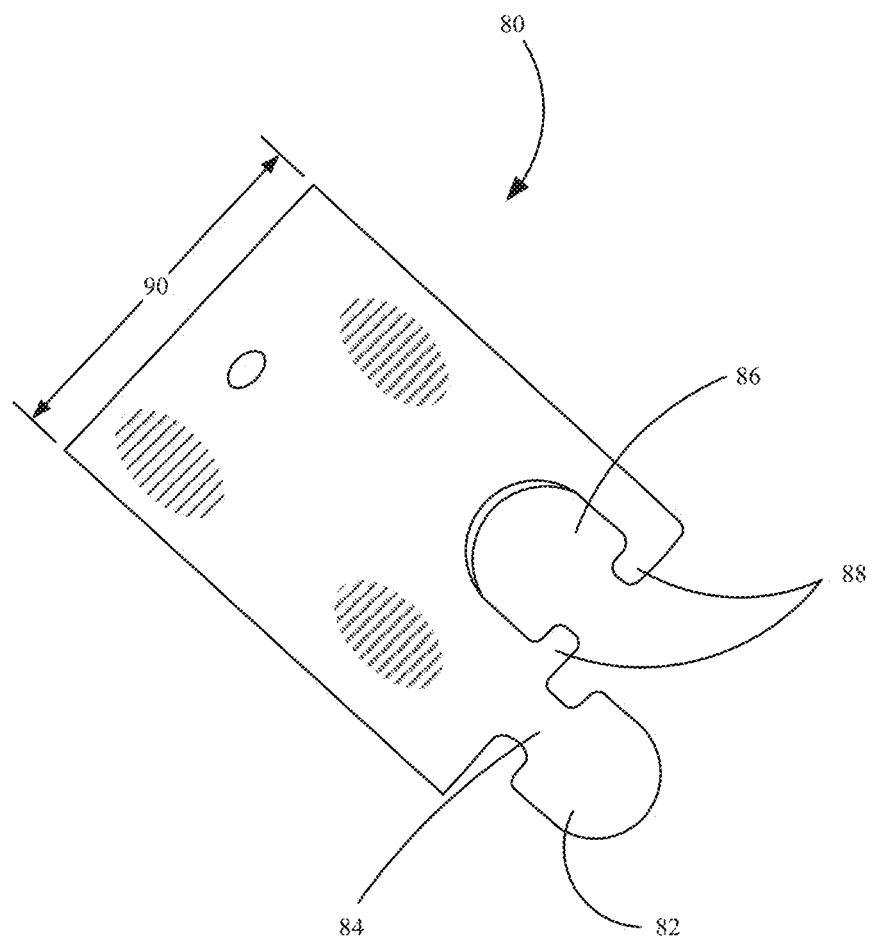

FIG. 1D illustrates a perspective view of a clamp portion 80. For example, clamp portion 80 may be illustrative of either clamp portions 74 or 76, in one embodiment. Clamp portion 80 illustratively has a height 90. Clamp portion 80 also comprises an indentation 86 and a protrusion 82. In one embodiment, protrusion 82 has the same footprint as indentation 86, such that indentation 86 can receive protrusion 82 of a second clamp portion 80, allowing the two clamp portions 80 to couple into a single clamp assembly. Protrusion 82 may comprise a neck 84, configured to fit between tabs 88 of indentation 86. In one embodiment, clamp portions 80 are configured to interlock due to the asymmetry as illustrated in FIG. 1D.

It may be advantageous to have a clamp come in two portions 80 for on-site assembly, because a clamp in one piece may need to be bent around, slid down, or otherwise maneuvered around the top of mounted support pole in order to be installed at its correct height. Using clamp portions 80 may allow for easier installation and assembly of a play structure. However, in another embodiment, a clamp 70 comprises a single component, such that portion 74 and 76 are pre-attached prior to installation.

In one embodiment, clamp portion 80 comprises metal. In one embodiment, clamp portion 80 comprises steel. In one embodiment, clamp portion 80 is stamped out of 9-12 gauge sheet metal and pressed into shape. In another embodiment, clamp portion 80 comprises a non-metal, durable material, such as plastic.

The locking mechanism, e.g., protrusion 82 and indentation 86, may be configured to attach to the corresponding locking features of another clamp portion 80. In one embodiment, the clamp comprises a tightening flange with an aperture to allow a fastening mechanism, e.g., fastening mechanism 72, to pass through and connect to the tightening flange of another clamp portion. By tightening fastening mechanism 72, clamp portions 80 can be tightened onto an anchor disposed in the anchor cradling curves of the clamp portion.

In one embodiment, the locking mechanism comprises a spade-shaped metal tab 82 and metal tab cutouts 88. A rounded shaped metal tab may have structural integrity problems, such as bending under high loads. A spade shape, in contrast, has structural as well as aesthetic values. In one embodiment, one clamp portion could be a first color, and an interlocking clamp portion could be another color creating a "ying-yang" design. However, in another embodiment, clamp portions can be the same color an anchor pole such that they blend in and do not substantially change the profile of the anchor post. In one embodiment, fastener 75 comprises a machine screw and a nut.

Figure 2A:
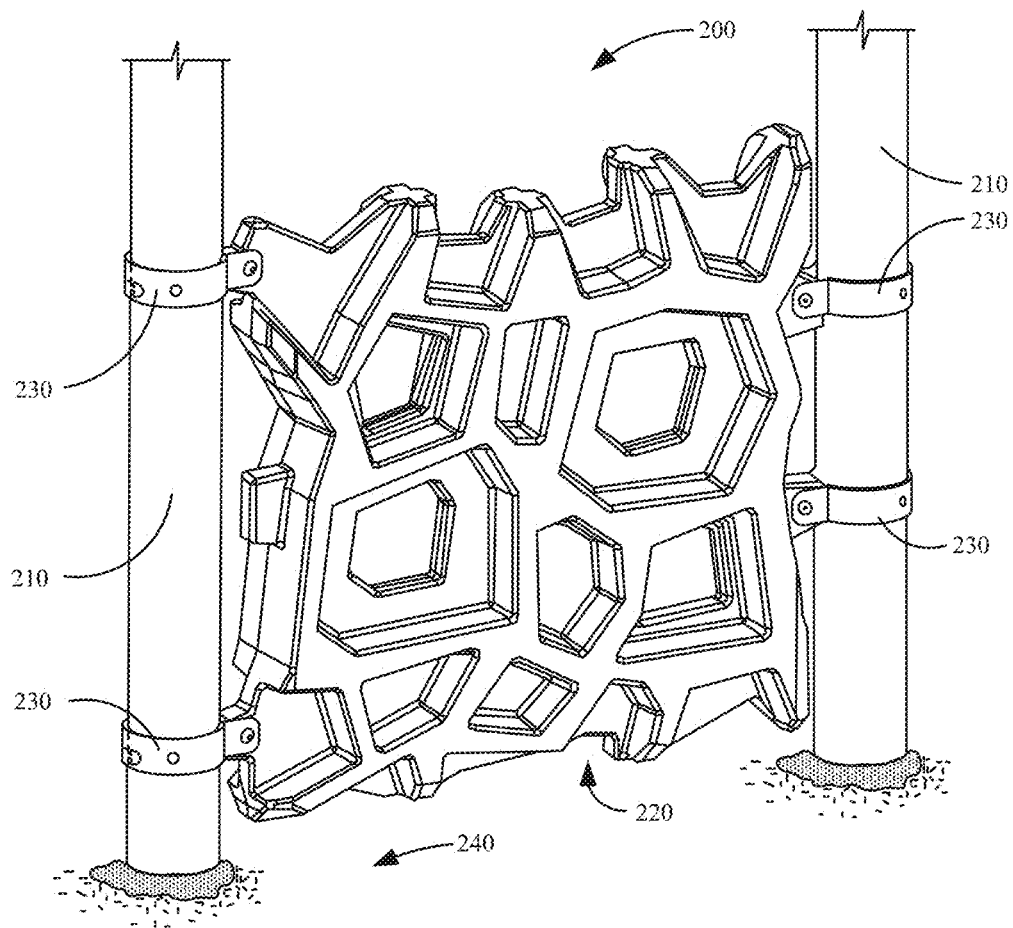
FIGS. 2A and 2B illustrate connections between a panel and clamp system to adjacent play structure posts in accordance with one embodiment of the present invention.
Figure 2B:
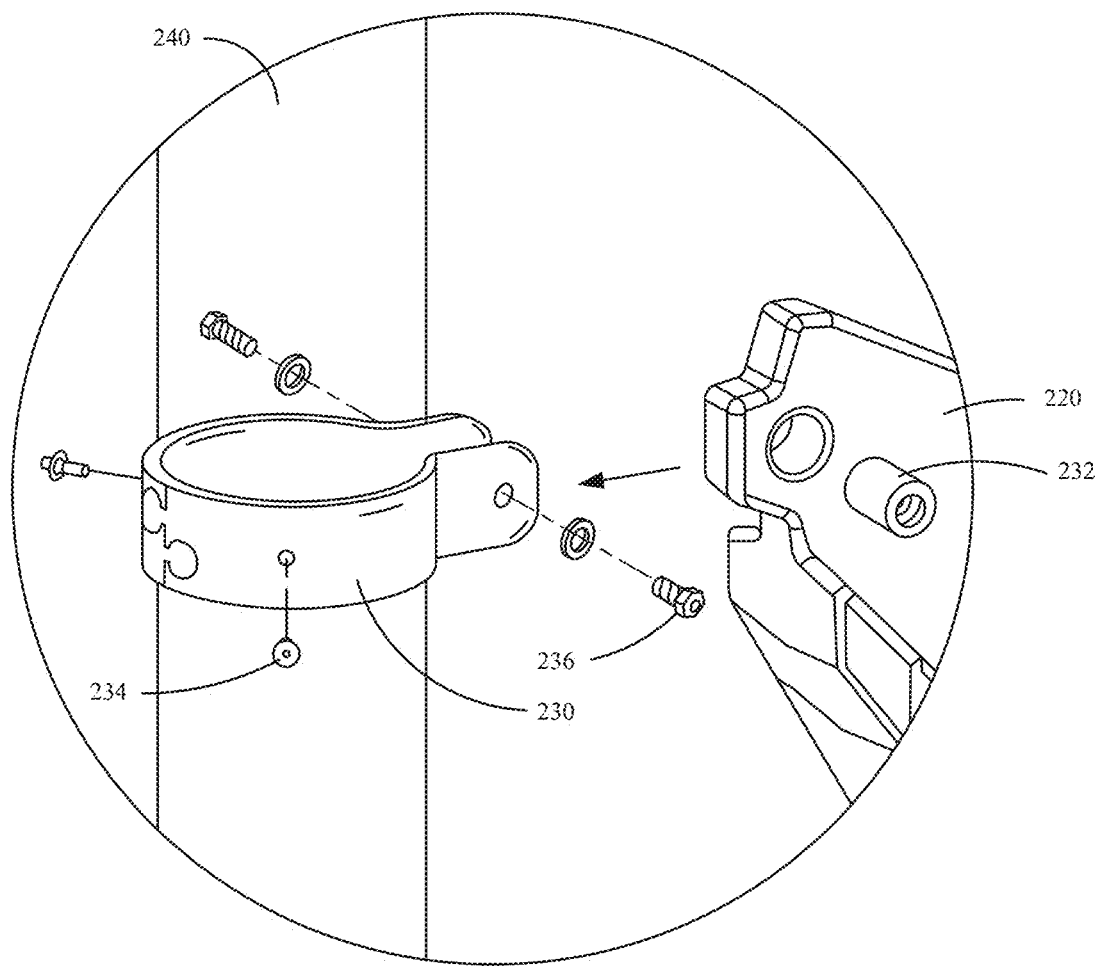

FIGS. 2A and 2B illustrate connections between a panel and clamp system to adjacent play structure posts in accordance with one embodiment of the present invention. As illustrated, posts 210 may be placed approximately a length of panel 220 apart. However, use of clamps 230 may allow for the distance between posts 210 to be slightly greater than a length of panel 220.

FIG. 2A illustrates a play system 200. Play system 200 comprises a panel 220 connected to two anchor poles 210. In one embodiment, panel 220 is coupled to anchor poles 210 by a plurality of clamps 230. Clamps 230 may each comprise two clamp portions 80, described above with respect to FIG. 1D. As illustrated in FIG. 2A, in one embodiment, clamps 230 each connect to panel 220 along one of four separate clamp planes. This may allow, for example, on a third adjacent pole, an additional panel to be attached such that a multi-panel wall can be formed. In one embodiment, play structure 200 also comprises protective surfacing 240, through which posts 210 are mounted. Protective surfacing 240 may comprise a surfacing configured to allow for children to fall from a climbing structure without sustaining significant injury.

FIG. 2B illustrates a connection scheme of attaching a panel 220 to a pole 210 using clamp 230. As illustrated in FIG. 2B, two clamp portions are affixed to pole 210, to create a clamp 230. Clamp 230 is configured to receive panel 220, and connection mechanism 232 is configured to extend through panel 220, and be received by fastening mechanism 236 on either side of clamp 230. In one embodiment, as illustrated in FIG. 2B, rivets 234 are configured to be attached through clamp 230, in order to hold clamp 230 in place on pole 210.

Figure 3A:
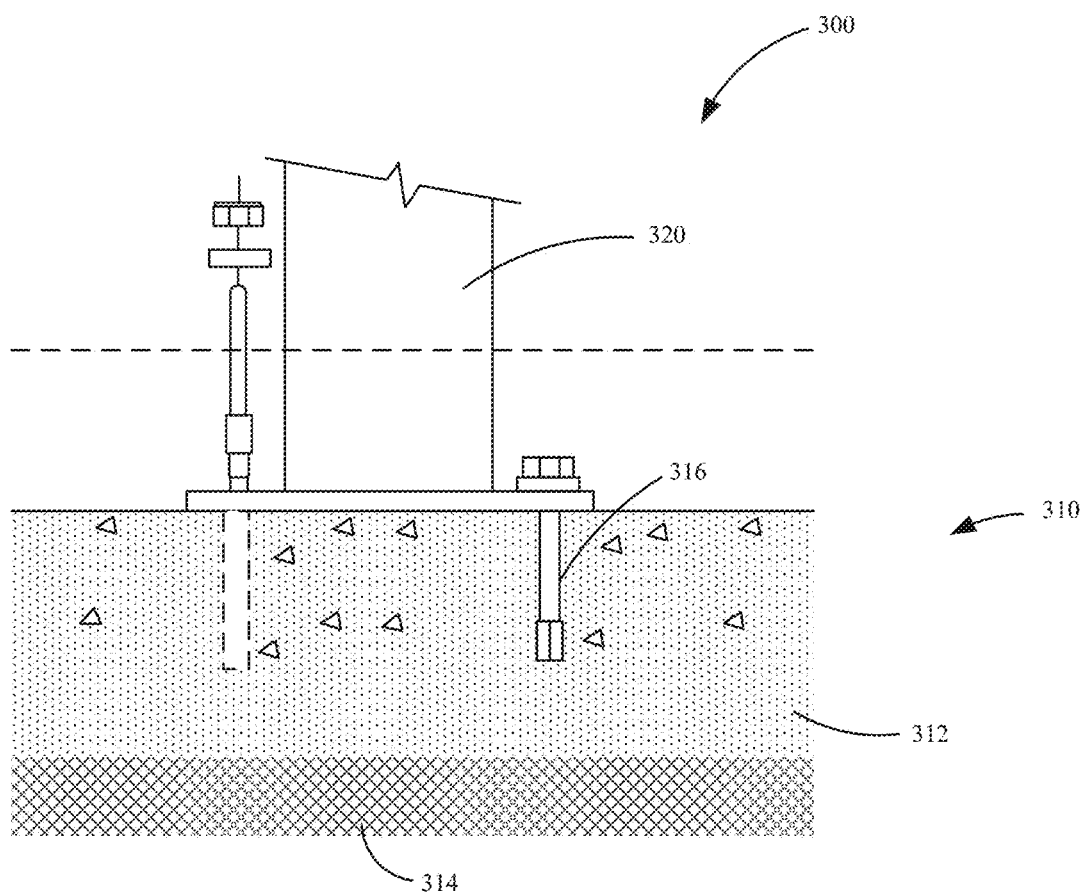
FIGS. 3A and 3B illustrate example mounting mechanisms for a play structure post within a playground environment in accordance with one embodiment of the present invention.
Figure 3B:
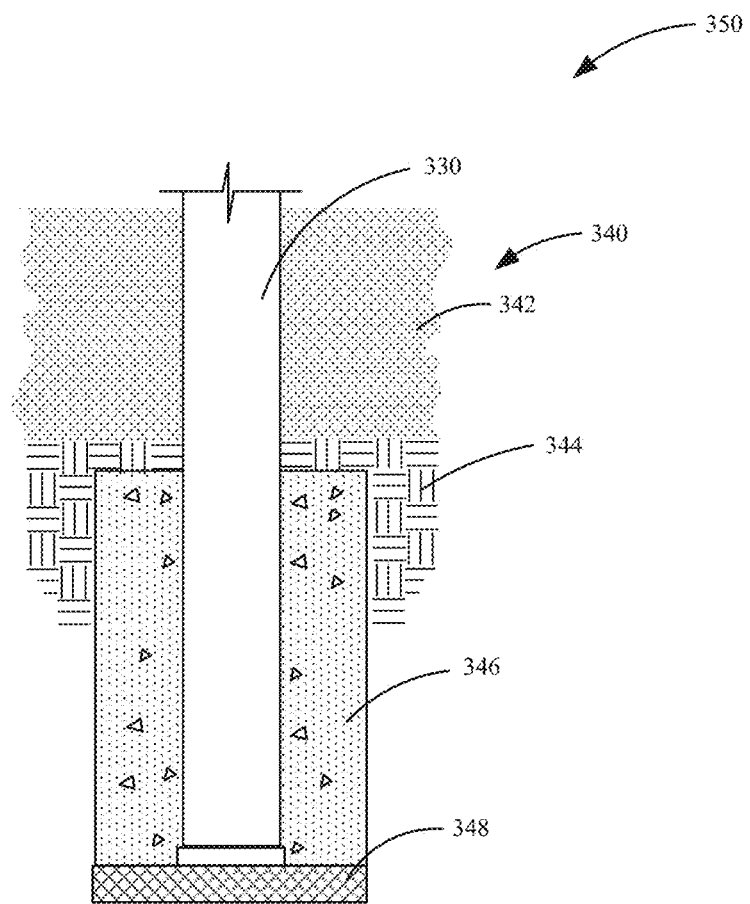

FIGS. 3A and 3B illustrate example mounting mechanisms for a play structure post within a playground environment in accordance with one embodiment of the present invention. However, at least some embodiments of clamps and panel systems can be used with other posts and other mounting mechanisms.

FIG. 3A illustrates a surface mount, in accordance with one embodiment of the present invention. Surface mount 300 comprises mounting a post 320 to a surface 310. Surface 310 comprises concrete 312 in one embodiment, or another suitably durable and hard material, on top of a compacted gravel layer 314. In one embodiment, post 320 is configured to attach to the concrete layer 312 using fastening mechanism 316. In one embodiment, fastening mechanism 316 comprises expansion anchors coupled to a hex nut and washer combination, which is used to attach to affix pole 320 to the ground.

FIG. 3B illustrates a direct burial mounting 350. As shown in FIG. 3B, post 330 extends into ground 340, through a protective surfacing layer 342, and a subgrade layer 344. Within subgrade layer 344, in one embodiment, is a concrete mounting block 346, into which post 330 extends. Post 330 may extend through concrete layer 346, and abut a crushed rock layer 348. However, while mounting options 3A and 3B are described, other suitable mounting mechanisms may exist for mounting a post within a play structure. Additionally, in other embodiments, the panel and clamp systems described herein can be used within a temporary setup, for example constructing a mobile climbing structure that can be setup and taken down as needed.

Figure 4:
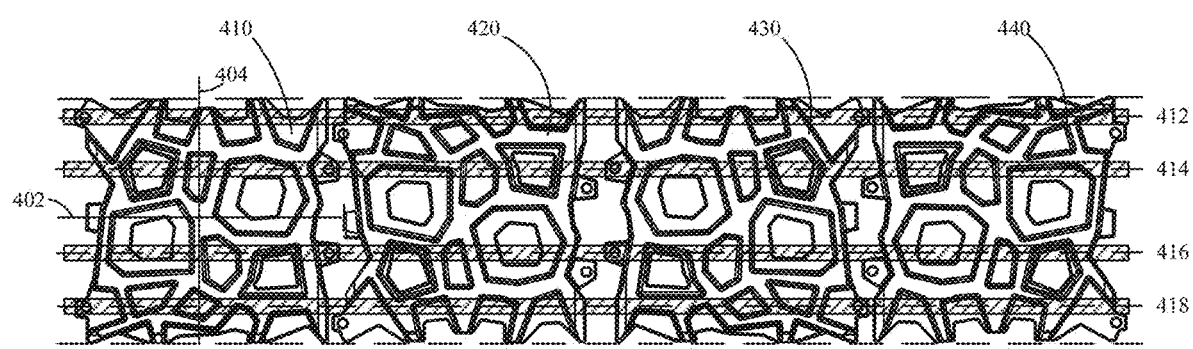
FIG. 4 illustrates one panel used within four different positioning options, in accordance with one embodiment of the present invention.

FIG. 4 illustrates one panel used in four different positioning options, in accordance with one embodiment of the present invention. Positions 420, 430 and 440 will be described with respect to position 410. For example, in one embodiment, rotating panel 410 about a horizontal axis 402 a distance of 180°, yields position 420, such that the clamp connecting features in position 420 are on the same side with respect to position 410. Position 430 can be obtained by rotating the panel from position 410 about a vertical axis 404 a distance of 180°, such that clamp connecting features are switched from a first side to a second side. Position 440 is obtained by taking the clamp of position 430, and rotating it a further 180° about horizontal axis 402. By rotating a panel in position 410 around horizontal axis 402, and vertical axis 404, the four different positions can be obtained. As illustrated, the four positions can interact with posts next to each other, such that no clamp conflict exists. Additionally, using a panel with an asymmetric design such as that shown in FIG. 4 allows for the appearance of a plurality of interchangeable parts, instead of a single panel design rotated into different positions.

As shown in FIG. 4, clamps can be used to couple the panel in position 410 across clamp planes 412, 414, 416, and 418, without conflict occurring with adjacent panels, such that a wall of panels is achievable within a play structure without clamp conflict. For example, as illustrated in FIG. 4, the panel in position 420 has clamp connection points slightly below the four clamp planes of position 410. Having mounting points on different clamp planes of an asymmetric panel allows for clamps to mount panels at substantially the same height to an anchor post with reduced clamp conflicts compared to other conventional clamp designs.

In one embodiment, the four plane locations are not identical in all of the four positions 410, 420, 430 and 440, allowing for further reduction in clamp conflicts as shown, and allows the panels to be flipped vertically and horizontally as described above, with reduced clamp conflicts, as shown in FIG. 4. In one embodiment, the design of panels are unique and asymmetrical as to allow reuse of the same panel in different orientations while providing the appearance of many unique pieces.

Prior to the embodiment as shown in FIG. 4, two identical components, such as climbing panels, mounted at the same height and sharing an anchor pole, would require offset, or other specialized clamps. Using a panel with multiple offset clamp planes, such as that shown in FIG. 4, provides a plurality of clamp planes available for fastening panels to poles without clamp conflicts, using a single clamp design throughout.

Figure 5:
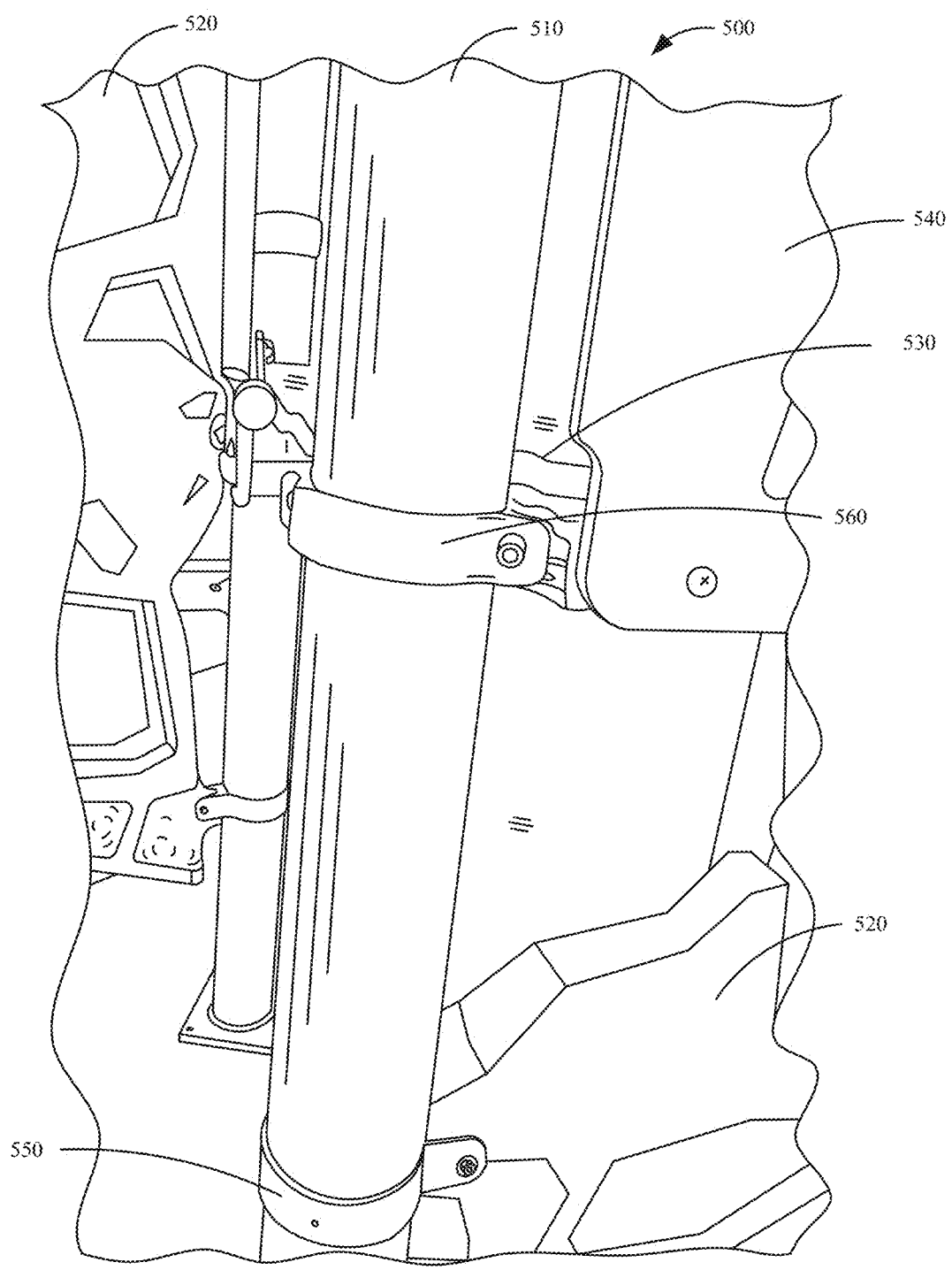
FIG. 5 illustrates a perspective view of two different installed clamp assemblies in accordance with one embodiment of the present invention.

FIG. 5 illustrates a perspective view of two different installed clamp assemblies in accordance with one embodiment of the present invention. Clamp 560 illustrates a conventional clamp used to couple a platform 530 to a plurality of posts 510. However, while previous designs required a platform 530, this restricts the shape climbing structures created to the 90° corners of platform 530.

FIG. 5 illustrates a play structure 500 with an anchor post 510 coupled to a platform 530, using a clamp 560. In previous systems, play towers and climbing structures could be created, using platforms 530, and panels 540, mounted directly to platform 530. However, multiple items could not be attached at the same height to post 510 using a standard clamp 560, without conflicting with clamps 560 attached to platform 530. Instead, additional features had to be mounted to platform 530, such as panels 540, or be at an offset height from platform 530.

Use of the panel and clamp system described herein, allows for panels 520, to be attached to anchor post 510, at the same height, using the different clamp planes, and attaching clamps 550 as shown. This can allow a play tower to be created without the required use of platforms 530, with different angles created by adjacent posts 510 with respect to each other.

Figure 6:
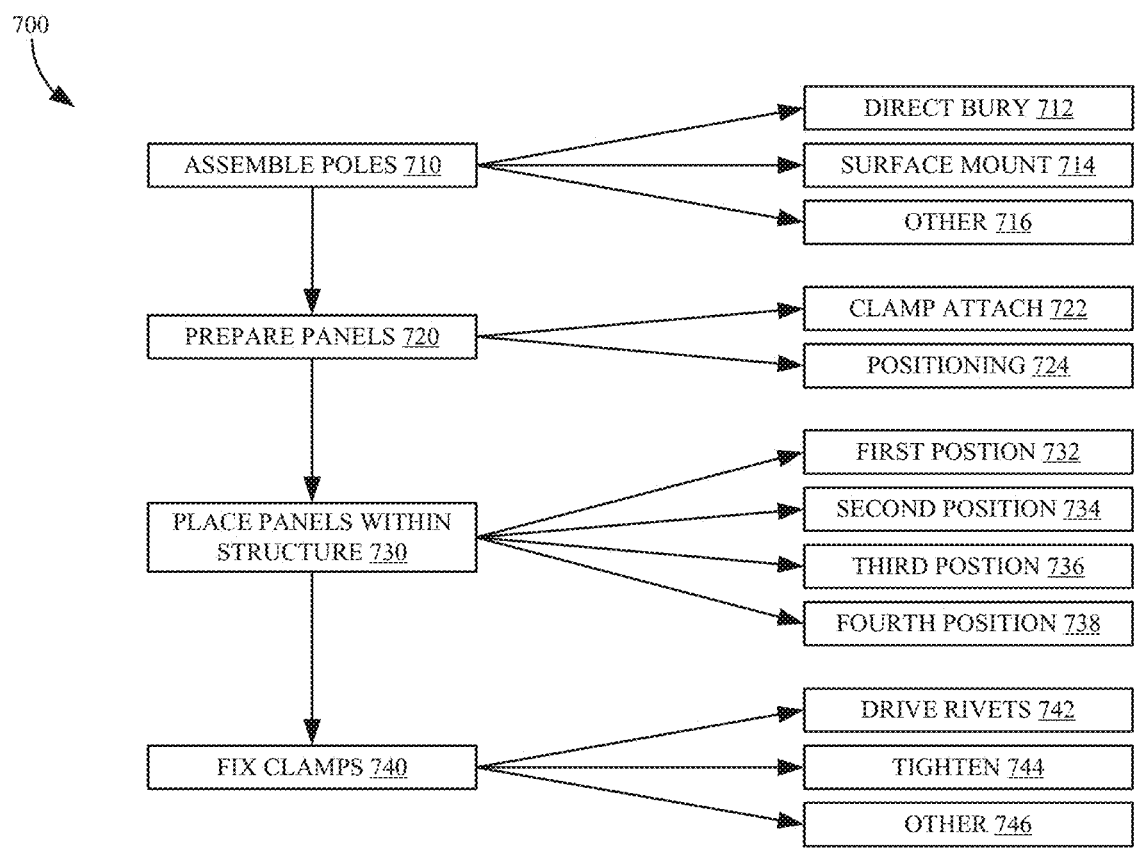
FIG. 6 illustrates an example method of installing a play structure system in accordance with one embodiment of the present invention.

FIG. 6 illustrates a method of installing a play structure system in accordance with one embodiment of the present invention. In one embodiment, method 700 may be useful to assemble a climbing structure for a playground installation. In one embodiment, climbing structure assembled using method 700 may comprise a tower with climbing walls.

In block 710, support posts are assembled. In one embodiment, posts, or anchor poles within a play structure are mounted at their respective mounting points. The support posts are configured to maintain structural integrity, and support the weight of multiple users on the finished system. Mounting can comprise using a direct bury method 712 or a surface mount method 714, as described above with respect to FIG. 3. However, other mounting mechanisms may be used, as illustrated in block 716. In the context of playground systems, posts are permanently installed within a play structure, preferably with a protective surfacing in order for safe play.

In block 720, panels are prepared for installation within the play structure. In one embodiment, preparing panels for attachment comprises attaching clamp portions to the panels, as indicated in block 722. However, in other embodiments, clamps are first attached around posts, and then coupled to panels using fastening mechanisms. Preparing panels, in block 720, can also comprise positioning the panels within a desired arrangement, as indicated in block 724. For example, between a first and second pole there may be a single panel, while between the second post and the third post there may be two panels, etc.

In block 730, panels are placed within the structure. In one embodiment, each installed panel can be placed within one of several positions, for example a first position 732, a second position 734, a third position 736, or a fourth position 738, as described above with respect to FIG. 4. In one embodiment, placing the panels in one of these four positions allows for panels to be placed at the same height within the system, without conflicting clamps.

In block 740, the panels are affixed to the structure. In one embodiment, this comprises fixing clamps, such as by driving rivets through the clamps into the post, fixing the coupled panel into place, as indicated in block 742. Another fixation method may comprise tightening the clamps in place, as indicated in block 744. However, other tightening mechanisms may also be used, as indicated in block 746.

Figure 7:
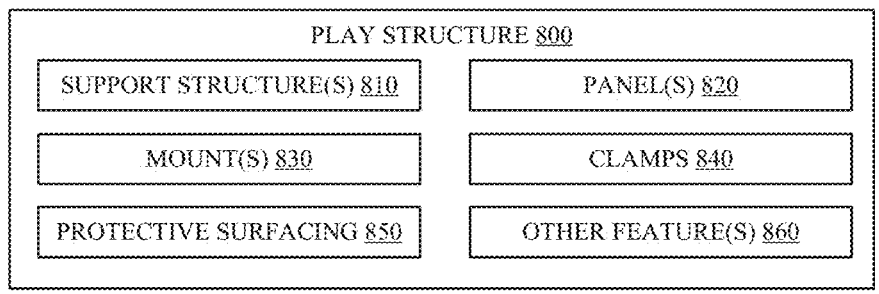
FIG. 7 illustrates a block diagram of a play structure in accordance with one embodiment of the present invention.

FIG. 7 illustrates a block diagram of a play structure 800. In one embodiment, play structure 800 comprises a plurality of support structures 810. In one embodiment, support structures 810 comprises posts anchored within a protective surfacing 850 using a mount 830. Protective surfacing 850 can be designed to allow for children and other users to fall more safely from the play structure.

In one embodiment, posts comprise 5-inch diameter posts. However, other post sizes can also be used. In one embodiment, a plurality of panels 820 are configured to be installed between adjacent support posts 810. Panels 820 may be coupled to, or between, support posts 810 using one or more clamps 840. In one embodiment, as described herein, clamps 840 are configured to attach panels 820 to support structures 810 such that panels are at the same height with respect to each other between adjacent support posts 810, without a conflict between clamps 840. Other features 860 may also be installed within the play structure, for example such as netting, platforms, rope holding or tensioning mechanisms, or other features.

Figure 8A:
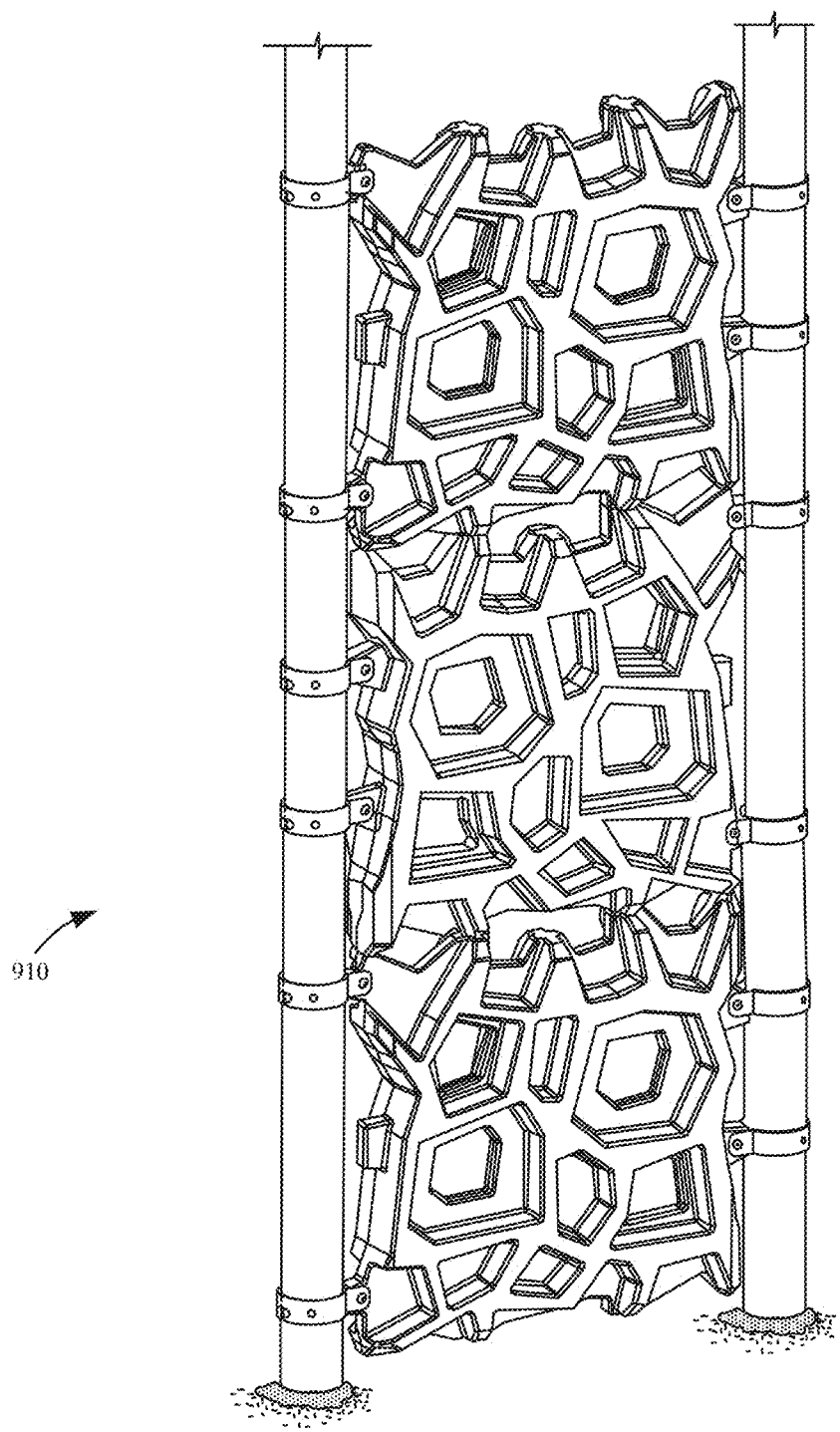
FIGS. 8A-8C illustrate a plurality of different play structures in accordance with embodiments of the present invention.
Figure 8B:
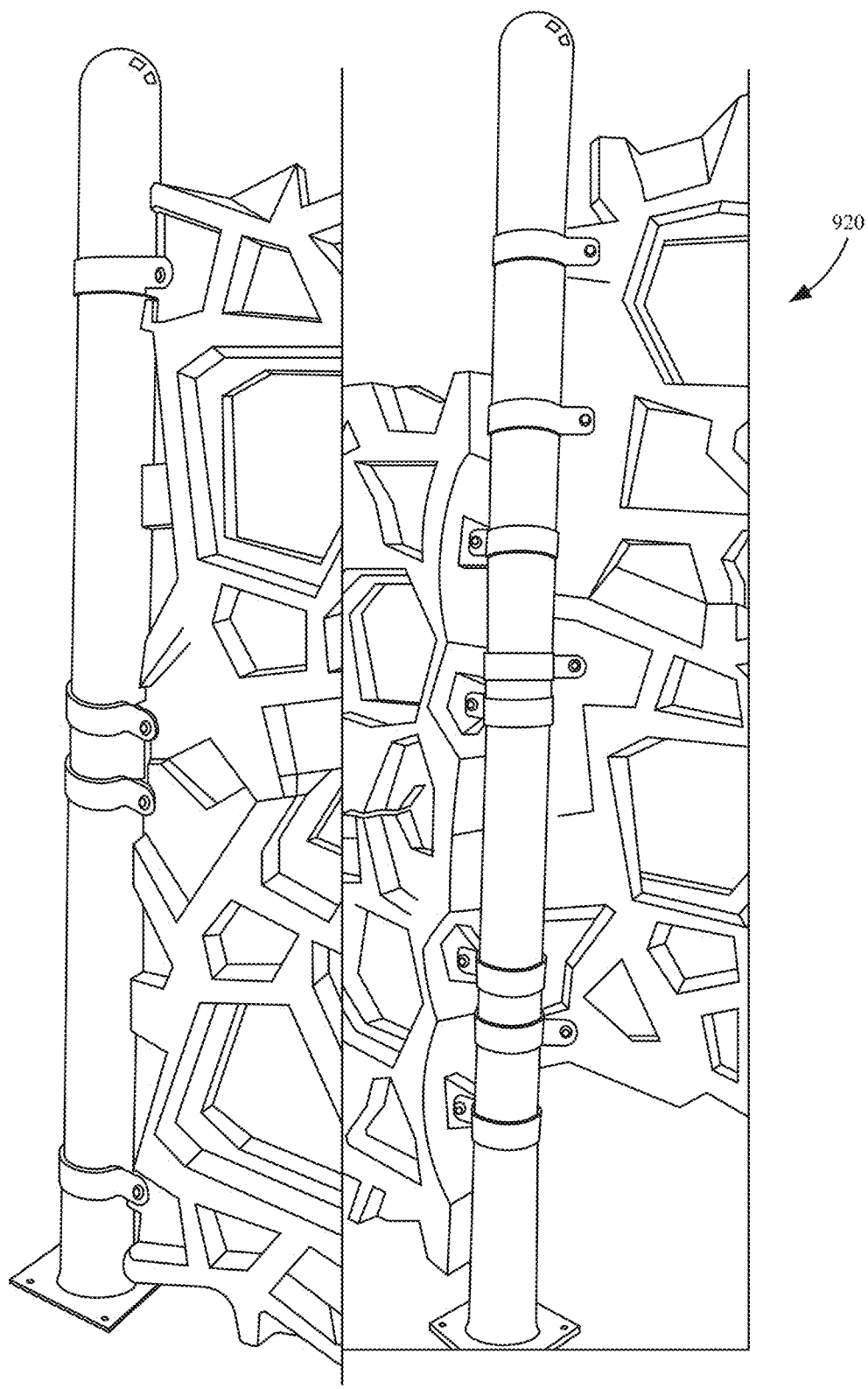
Figure 8C:
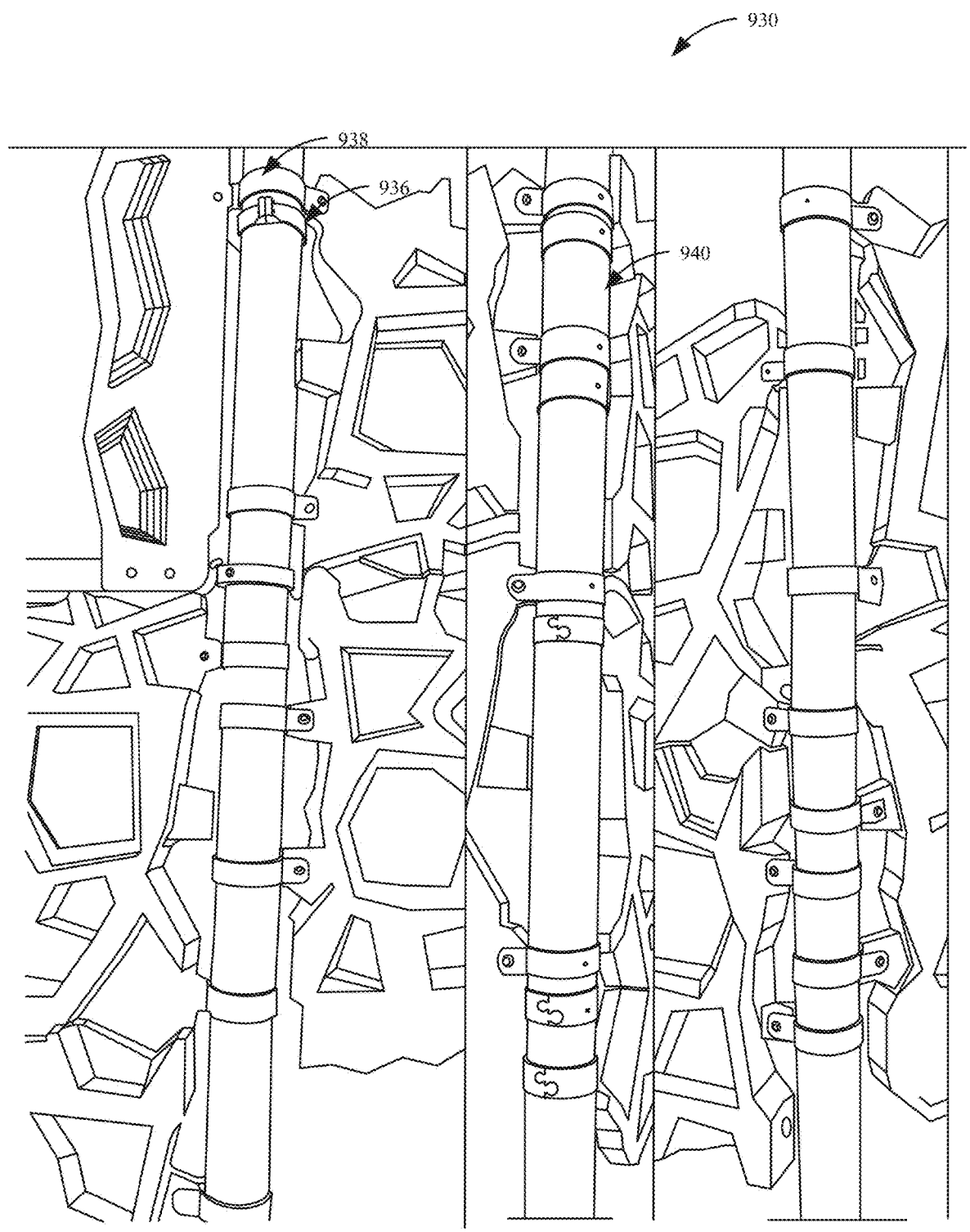

FIGS. 8A-8C illustrate a plurality of different play structures in accordance with embodiments of the present invention. The embodiments illustrated in structures 910, 920 and 930 are only illustrative of the different options available using the clamp and panel designs described herein.

FIG. 8A illustrates a set of three panels coupled between adjacent posts using a series of clamps. As illustrated, clamps have a narrow profile, and couple along each of four connection planes for a panel. The arrangement of structure 910 may be replicable between one of the two illustrated posts, and a third post, without clamp conflict.

FIG. 8B illustrates a structure 920 with adjacent panels attached between adjacent posts in a configuration 920. Prior to the embodiments described herein, platforms were used to connect anchors and build climbing walls. The drawback to using platforms, is that a wall angle is limited to the angle of the platform (normally 90°, 180° or 45° increments). As shown in FIG. 8B, however, using a clamp system, a wall can be positioned at any angle 922 in relation to the adjacent support posts. By utilizing a variety of angles, more unique configurations can be built, which offers a rich play environment.

FIG. 8C illustrates another example structure, with a plurality of climbing walls created between adjacent support posts. A first wall 934 is adjacent to a second wall 932, in one embodiment. First and second walls are coupled to a shared support post 940, using clamps 936 and 938, respectively. As illustrated herein, panels comprise geometric shapes and cutouts. However, different asymmetric panel sizes and designs are possible, as illustrated by walls 934 and 932. However, while rectangular and square designs are shown and described herein, any suitable shape configured to be installed between adjacent posts may be suitable.

FIGS. 9A-9E illustrate a plurality of play structures that can be created using embodiments of the present invention described herein. FIGS. 10A-10E illustrate a plurality of different play structures that can be assembled using the clamp and panel systems as described herein. However, while a plurality of different configurations are shown, the configurations presented in FIGS. 10A-E are only illustrative of the different structures that can be assembled.

As illustrated, a plurality of angles can be achieved between panels using the components described herein, allowing for a variety of shapes of climbing structures. For example, as shown in play structure 1010, of FIG. 9A, panels can be arranged approximately 120° away from each other, such that three separate climbing wall environments are created. And, in an embodiment where asymmetrical panels are used, each of the three climbing wall environments 1012, 1014 and 1016 can appear to have different patterns by utilizing the different position options described with respect to FIG. 4, and illustrated with respect to FIG. 9C below.

Figure 9A:
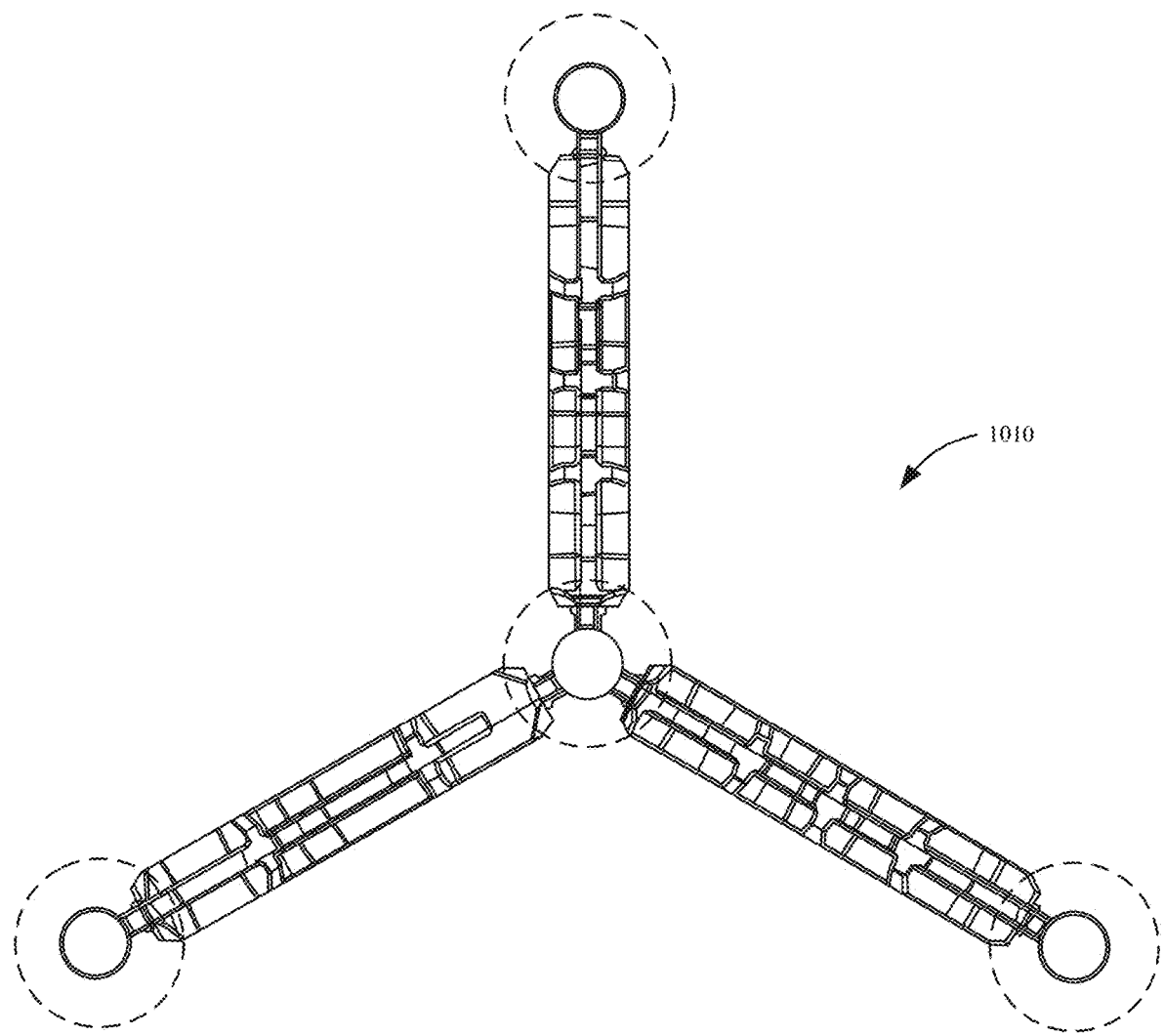
FIGS. 9A-9E illustrate a plurality of play structures that can be created using embodiments of the present invention described herein.
Figure 9B:
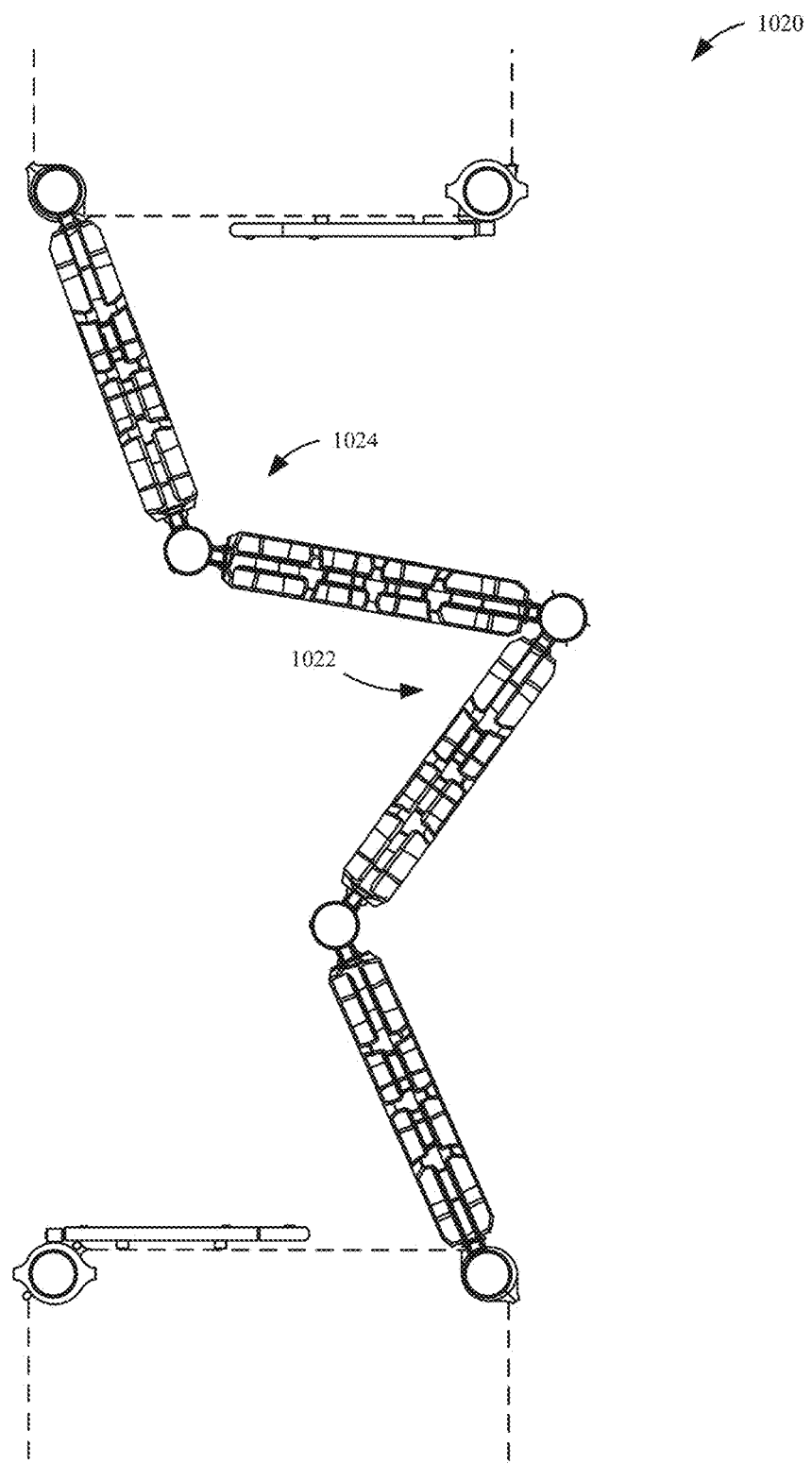

Additionally, as illustrated in play structure 1020 of FIG. 9B, a wall can have a regular or irregular zig-zagging shape as it extends across a play environment. Because of the flexibility, and thin profile of the clamps used, both acute angles 1022 and obtuse angles 1024 can be created.

Figure 9C:
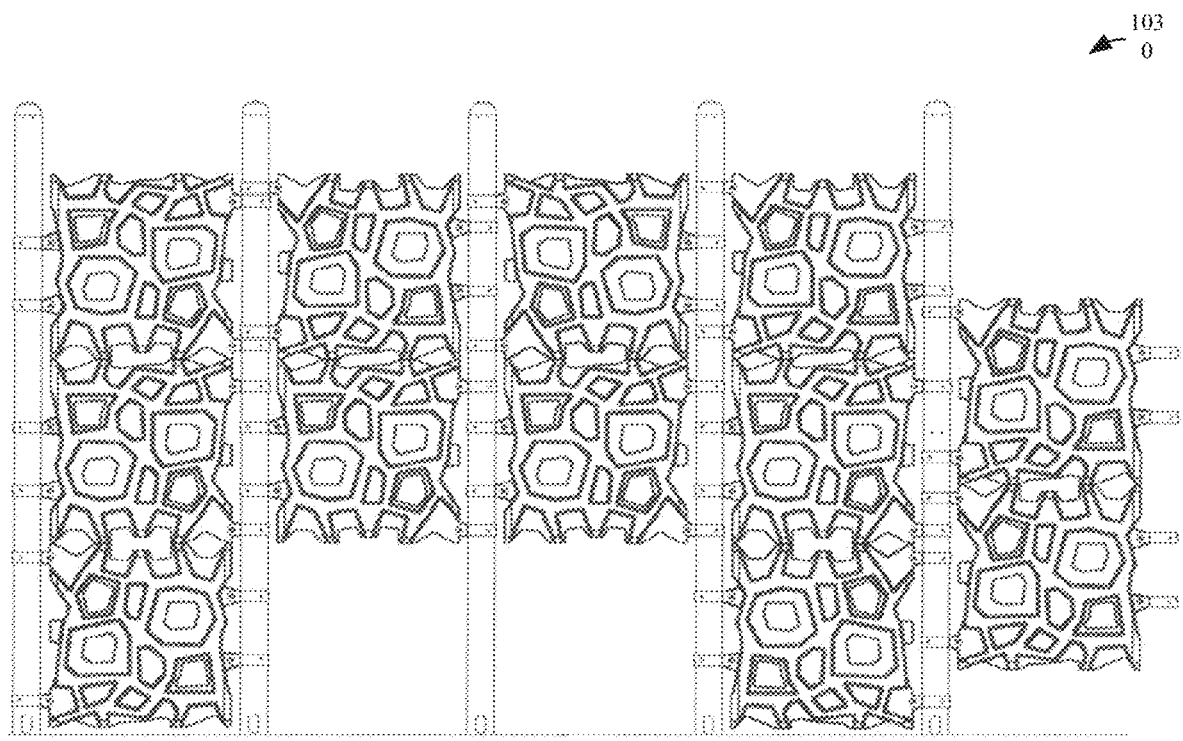

Additionally, as illustrated in FIG. 9C, a plurality of different wall designs can be used, to create walls adjoining each other to create a structure 1030. As illustrated in FIG. 9C, using an asymmetrical panel, in conjunction with the four clamp planes described herein, allows for the appearance of multiple unique shapes and connection schemes to be presented to a user of the play structure, providing a more enriching experience.

Figure 9D:
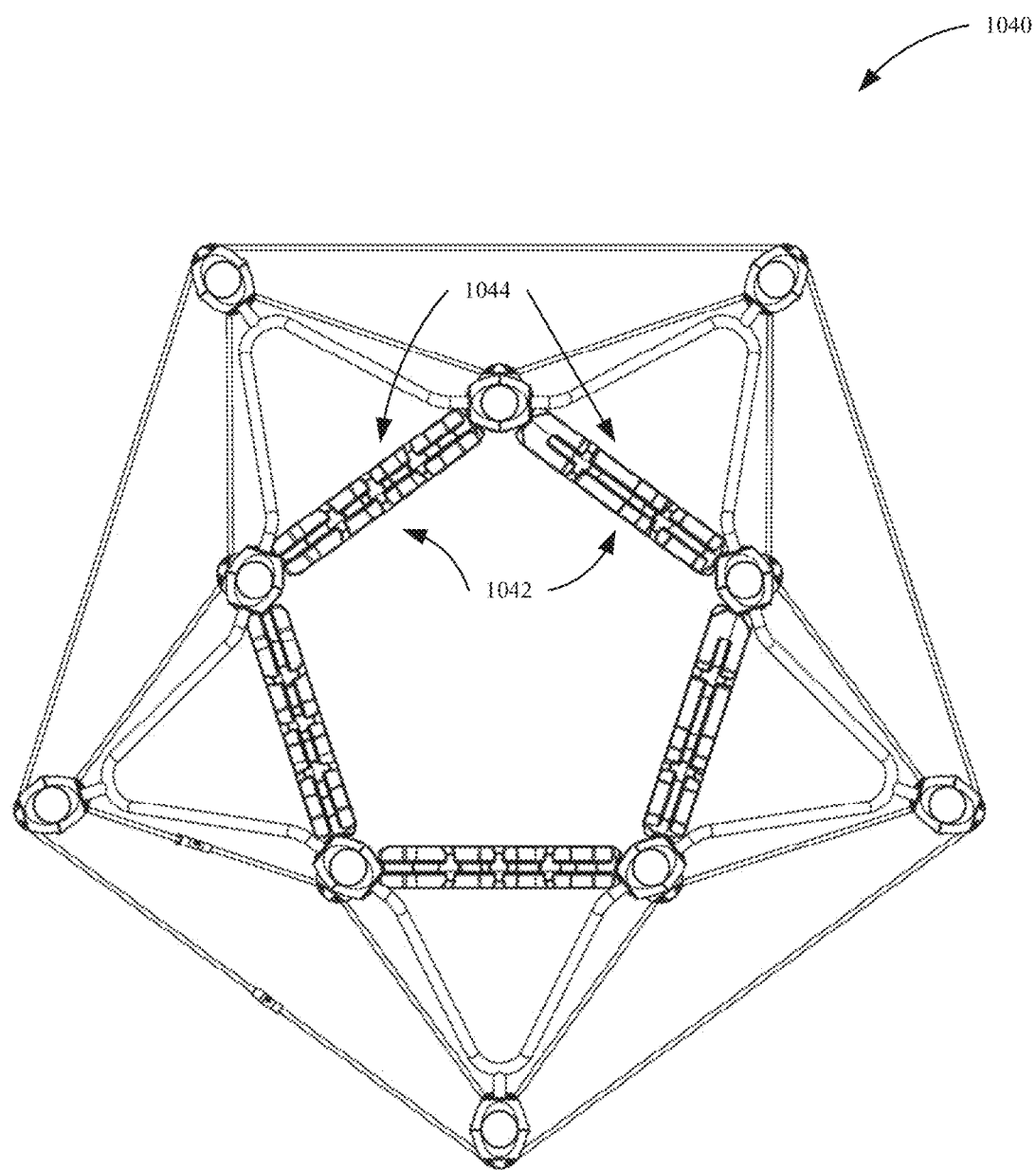

In FIG. 9D, system 1040 illustrates how panel and clamp systems can be used in conjunction with other play features, to provide an engaging and enriching experience for users. For example, system 1040 comprises both interior walls 1042 and exterior walls 1044. Additionally, other features, such as rope, netting, or other interactive features can also be added to create a variety of play experiences.

Figure 9E:
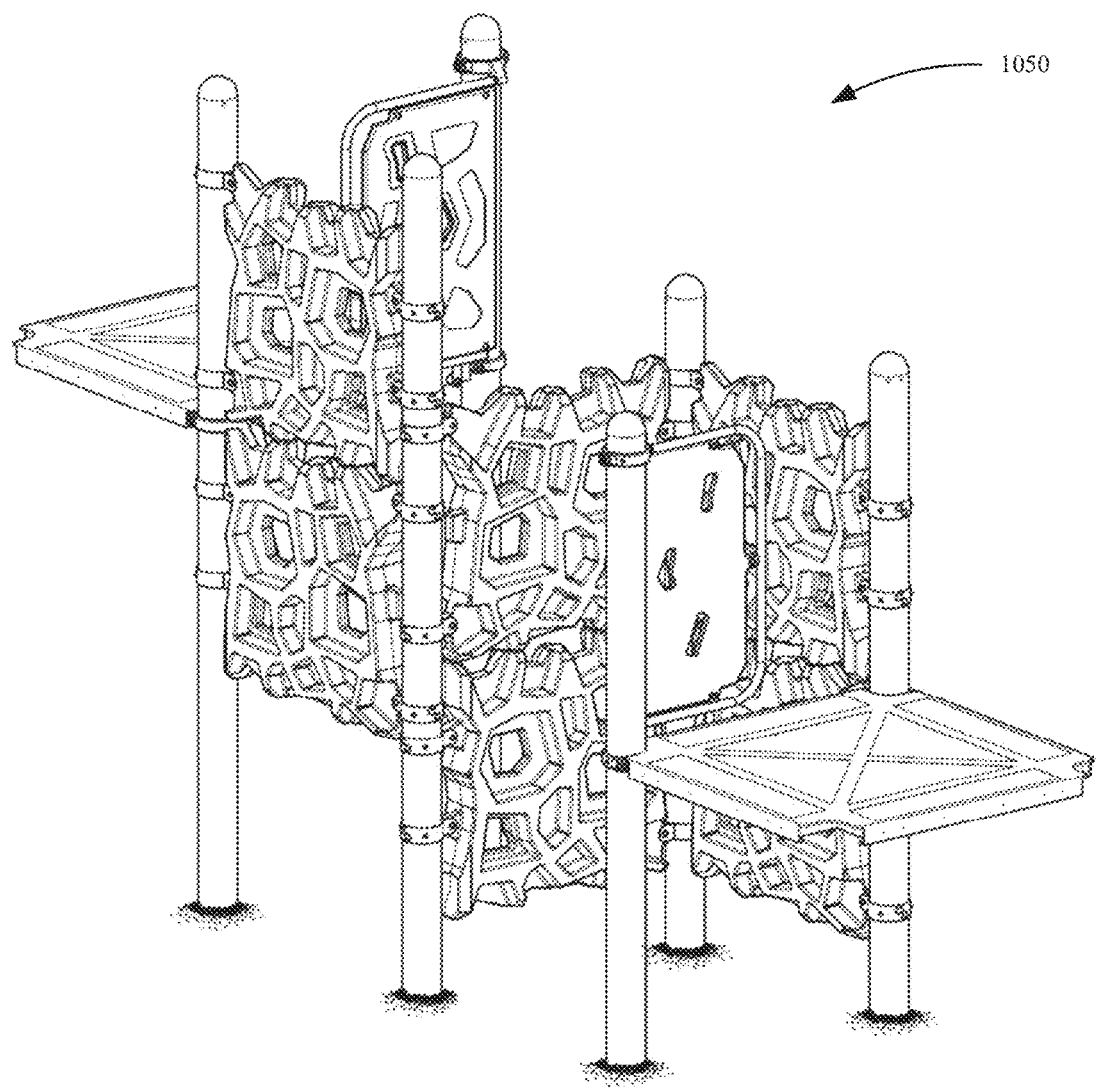

FIG. 9E illustrates a structure 1050 with adjacent walls positioned rotationally 90° away from adjoining walls. As illustrated in FIG. 9E, the clamp and panel components described herein can be used with additional features, such as platforms.

Although the present invention has been described with reference to preferred embodiments, workers skilled in the art will recognize that changes may be made in form and detail without departing from the spirit and scope of the invention.

What is claimed is:

1. A climbing structure comprising:
a first support post;
a second support post;
a panel, configured to be coupled to the first and second support post, comprising:
a plurality of post connection mechanisms distributed around an outside perimeter of the panel such that a post connection point on one side of the panel is not in a same plane with a post connection mechanism on an opposite side of the panel; and
a clamp configured to couple the panel to the second post through engagement of the clamp to one of the post connection point mechanisms.

2. The climbing structure of claim 1, wherein a distance between two post connection mechanisms on said one side of the panel is different than a distance between any two post connection mechanisms on said opposite side of the panel.

3. The climbing structure of claim 1, further comprising a clamp configured to couple the panel to the second post, wherein the clamp includes a first portion and a second portion that connect together to form a substantially circular configuration.

4. The climbing structure of claim 3, wherein the first portion is a lock portion and the second portion is a key portion.

5. The climbing structure of claim 1, further comprising a clamp configured to couple the panel to the second post through an engagement of the clamp to one of the post connection mechanisms, wherein the clamp includes two different mechanisms for securing a first part of the clamp together with a second part of the clamp.

6. The climbing structure of claim 1, further comprising:
at least one asymmetrical aperture in the panel.

7. The climbing structure of claim 6, wherein the at least one asymmetrical aperture is offset from a center of the panel.

8. A climbing structure comprising:
a first support post and a second support post; and
a panel, the panel comprising a first side and a second side, the first side having:
a first and second post connection point configured to couple to the first support post, the first side having a first visually distinct shape;
the second side having:
a third and fourth post connection point configured to couple to the second support post, the second side having a second visually distinct shape different from the first side; and
wherein the third post connection point and fourth post connection point are spaced apart from one another a first distance and the first post connection point and second post connection point are spaced from one another a second distance, wherein the first distance and the second distance are different, and wherein the first and second post connection points are positioned such that neither is on the same plane as the third or the fourth post connection points on the second side of the panel.

9. The climbing structure of claim 8, wherein the panel is a first panel, and wherein a second panel is also configured to be coupled between the first support post and the second support post such that the first panel is positioned immediately below, and adjacent to so as to be substantially in parallel alignment with, the second panel.

10. The climbing structure of claim 8, further comprising: a third support post and a third panel, wherein the third panel is coupled to the third support post and the second support post such that the third panel is at the same height as the first panel with respect to a ground.

11. The climbing structure of claim 8, further comprising: a first clamp, configured to couple the panel to the first support post at the first post connection point.

12. The climbing structure of claim 11, further comprising: a second clamp, configured to couple the panel to the second support post at the third post connection point.

13. The climbing structure of claim 12, wherein each of the first and second clamps comprise a first portion and a second portion.

14. The climbing structure of claim 13, wherein each of the first and second clamp portions comprise a locking mechanism that includes a protrusion and an indentation such that the clamp assumes a substantially circular configuration when the protrusion of the first clamp portion is fit into the indentation of the second clamp portion, and when the protrusion of the second clamp portion is fit into the indentation of the first clamp portion.

15. The climbing structure of claim 14, wherein the protrusion comprises a spade-shaped protrusion.

16. The climbing structure of claim 14, wherein the indentation comprises two tabs.

17. A panel configured to be installed within a climbing structure, the panel comprising:
a first face comprising a first plurality of climbing features;
a second face opposite the first face and comprising a second plurality of climbing features;
a first edge having a first clamp connection point and a second clamp connection point;
a second edge having a third clamp connection point and a fourth connection point, wherein a first distance between the first clamp connection point and the second clamp connection point is different than a second distance between the third clamp connection point and the fourth clamp connection point;
wherein the panel comprises an asymmetric design such that no clamp connection point on the first edge is in a same plane as any other clamp connection point or clamp connection mechanism on the second edge.

18. The panel of claim 17, wherein the asymmetric design comprises one or more asymmetrical apertures, such that a 180 degree rotation along a vertical axis from a first position causes the panel to appear to be a different design in a second, rotated, position than that in the first position.

19. The panel of claim 17, wherein the asymmetric design comprises one or more asymmetrical apertures, such that a 180 degree rotation along a horizontal axis from a first position causes the panel to appear to be a different design in a second, rotated, position than that in the first position.

* * * * *